ન
3,533,915
PROCESS FOR PRODUCING HIGHER
TITERS OF LYDIMYCIN
Ladislav J. Hanka, Kalamazoo, Mich., Ronald B. Kelly, Saint John, New Brunswick, Canada, and Lester M. Reineke, Portage, Mich., assignors to The Upjohn Company, Kalamazoo, Mich., a corporation of Delaware
No Drawing. Filed Mar. 22, 1968, Ser. No. 715,154
Int. Cl. C07g 11/00
U.S. Cl. 195—114
3 Claims

ABSTRACT OF THE DISCLOSURE

Microbiological process which produces higher titers of the antibiotic lydimycin than known prior art processes. Lydimycin is a known antibiotic having antifungal properties.

The invention described herein was made in the course of, or under, a contract with the Department of Health, Education and Welfare.

BRIEF SUMMARY OF THE INVENTION

Lydimycin in a known antibiotic described in U.S. patent application Ser. No. 434,434 now Pat. No. 3,395,-220, filed Feb. 23, 1965; Belgium Pat. 676,933; French Pat. 1,466,881; and Spanish Pat. 322,985. Recent data shows that lydimycin has the following structural formula:

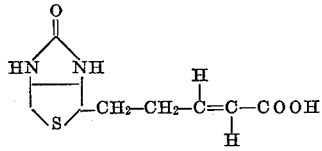

Lydimycin inhibits the growth of Nocadi asteroides, Blastomyces dermititidus, Geotrichum sp., Phialophora verrucosa, Cryptococcus nebformans, Histoplasma capsulatum, and Trichophyton mentagrophytes. Thus, lydimycin is useful alone or in combination with other antifungal or antibiotic agents to prevent the growth of, or reduce the number of, susceptible organisms present in various environments, for example, in plants, birds, fish, and reptiles. Also, lydimycin is useful in wash solutions for sanitation purposes. The microbiological process disclosed in U.S. patent application Ser. No. 434,434 now Pat No. 3,395,220, Example No. 1, and in Example 1 of each of the patents hereinabove disclosed, is the best known prior art process for preparing lydimycin.

The process of the subject invention comprises the addition of an effective amount of biotin to a lydimycin fermenation. Addition of biotin in the range of about 2.5 mcg./ml. to 40 mcg./ml. of lydimycin fermentation medium has been found suitable. For example, when about 10 to 20 mcg./ml. of biotin was added to a lydimycin fermentation medium, as disclosed in Example 1 of U.S. patent application Ser. No. 434,434, the fermentation titer of lydimycin was 6 to 7 times higher than controlled runs where no biotin was added. Further, the peak titer of lydimycin, when about 20 mcg./ml. is added to the fermentation medium, is reached after about 4 days fermentation time. On the other hand, the peak titer of lydimycin in the best known prior art process is not reached until after about 5 to 6 days of fermentation time. Thus, the process of the subject invention not only produces substantially higher fermentation titers of lydimycin, but it also accomplishes this desirable result in less fermentation time than is required in the above-noted best prior art process.

DETAILED DESCRIPTION

The microorganism, Streptomyces lydicus, used in the process of the subject invention is a known actinomycete which is described in U.S. Pat. 3,160,560. A subculture of Streptomyces lydicus can be obtained from the permanent collection of The Northern Utilization Research and Development Division, Agricultural Research Service, U.S. Department of Agriculture, Peoria, Ill., U.S.A. Its accession number in this repository in NRRL 2433.

Biotin, which is used as an additive in the subject process, is also known as vitamin H. The richest sources of biotin are liver, kidney, pancreas, yeast, and milk. Biotin can be added to the subject fermentation medium prior to inoculation with the microorganism S. lydicus, or at a time soon after the inoculation. Since no conclusive evidence of toxicity of the biotin on the growth of the microorganism or production of lydimycin has been observed at levels up to 40 mcg./ml., the biotin can be added all at once, if desired. Alternatively, if desired, the biotin can be added in increments over a period of time. Preferably, all the biotin should be in the fermentation medium within 24 hours after inoculation of the medium. An effective amount of biotin ranging from more than incidental impurities up to 40 mcg./ml. of aqueous nutrient medium can be added into the fermentation medium.

The following examples are illustrative of the process of the present invention, but are not to be construed as limiting. All percentages are by weight and all solvent mixture proportions are by volume unless otherwise noted.

EXAMPLE 1

A soil stock of Streptomyces lydicus, NRRL 2433, was used to inoculate a series of 500-ml. Erlenmeyer flasks containing 100 ml. of seed medium consisting of the following ingredients:

Glucose monohydrate—25 g.
Pharmamedia [1]—25 g.
Tap water q.s.—1 liter

[1] Pharmamedia is an industrial grade of cottonseed flour by Trader's Oil Mill Company, Fort Worth, Tex.

The seed inoculum was grown for 2 days at 28° C. on a Gump rotary shaker operating at 250 r.p.m.

Seed inoculum (5 ml.) described above, was used to inoculate each of a series of 500-ml. Erlenmeyer flasks containing 100 ml. of the following sterile fermentation medium:

Glucose monohydrate—10 g.
Dextrin—20 g.
Pabst's yeast [1]—10 g.
Cottonseed meal—10 g.
Ucon [2]—1 ml.
Tap water q.s.—1 liter

[1] Brewer's yeast obtained from the Pabst Brewing Company.
[2] An antifoam produced by The Union Carbide Corp.

The following amounts of sterile biotin were added to various flasks at the time of inoculation: 2.5 mcg./ml., 5.0 mcg./ml., 10.0 mcg./ml., 20.0 mcg./ml., 25 mcg./ml., and 40 mcg./ml. Control flasks were run without addition of biotin. The fermentation flasks were grown for 5 days at a temperature of 32° C., on a Gump rotary shaker operating at 250 r.p.m. The flasks were assayed at intervals against the microorganism *Saccharomyces pastorianus*. The results, expressed in mcg./ml. of lydimycin, were as follows:

| Days: | Concentration of added biotin in mcg./ml. | | | | | | |
|---|---|---|---|---|---|---|---|
| | 0 | 2.5 | 5.0 | 10.0 | 20.0 | 25.0 | 40.0 |
| 1 | 1.25 | 5.5 | 1.25 | 0 | 0 | 0 | 0 |
| 2 | 3.1 | 6.9 | 15.5 | 18.2 | 0 | 0 | 0 |
| 3 | 5.5 | 15.5 | 23.5 | 35.5 | 37.5 | 0 | 0 |
| 4 | 8.4 | 19.0 | 16.5 | 35.5 | 48.5 | 56.5 | 0 |
| 5 | 11.5 | 15.3 | 23.5 | 30.5 | 44.0 | 44.0 | ~44.0 |

The *S. pastorianus* assay, noted above, was conducted as follows:

This is a disc-plate assay using a medium consisting of the following ingredients:

$KH_2PO_4$—5 gm.
Glucose—30 gm.
Yeast extract—7 gm.
Agar—20 gm.
Distilled $H_2O$—1 liter The molten agar was seeded (3 ml./liter) with an overnight culture of *S. pastorianus*. The seeded agar was dispensed into 100 x 20 mm. plastic petri dishes in 8-ml. volumes and the agar was allowed to solidify. The fermentation liquors to be tested (0.08 ml. volumes) were applied to ½″ paper discs which were placed on the surface of the agar. The plates were incubated at 28° C. for 18 hours and the diameters of the zones of inhibition were measured. The potency of the samples is read off the standard curve. The concentrations of the drug used for the construction of the standard curve were 10; 5; 2.5 and 1.25 μg./ml.

The lydimycin in the fermentation flasks can be isolated and purified by the procedures disclosed in Example 1, U.S. patent application Ser. No. 434,434 now Pat. No. 3,395,220, (the same recovery procedure is disclosed in Example 1 of Belgian Pat. 676,933; French Pat. 1,466,881; and Spanish Pat. 322,985) to give lydimycin crystals.

We claim:

1. In a process for preparing high titers of the antibiotic lydimycin in a submerged aerobic fermentation using *Streptomyces lydicus*, NRRL 2433, the improvement which comprises incorporating an effective amount of biotin into the fermentation medium and isolating the lydimycin so produced.

2. In a process, according to claim 1, for preparing the antbiotic lydimycin in a submerged aerobic fermentation using *Streptomyces lydicus*, the improvement which comprises incorporating biotin in an effective amount ranging from more than incidental impurities up to 40 mcg./ml. of aqueous nutrient medium into the fermentation medium.

3. A process according to claim 1 wherein about 10 to 25 mcg./ml. of biotin is incorporated into the fermentation medium.

References Cited

Science, vol. 154, No. 3752, Nov. 25, 1966, pp. 1667–1668.

MAURICE W. GREENSTEIN, Primary Examiner

U.S. Cl. X.R.

195—80; 260—309.7

UNITED STATES PATENT OFFICE
CERTIFICATE OF CORRECTION

Patent No. 3,533,915          Dated October 13, 1970

Inventor(s) L. J. Hanka; R. B. Kelly; S. John; L. M. Reineke

It is certified that error appears in the above-identified patent and that said Letters Patent are hereby corrected as shown below:

Col. 1, line 25, for "in a known" should read -- is a known --; line 37 for "Nocadi" should read -- Nocardia --. Col. 2 line 14, for "in NRRL" should read -- is NRRL --; lines 44 & 45, for "flour by" should read -- flour produced by --. Col. 4, line 9, for "high titers" should read -- higher titers --.

Signed and sealed this 8th day of June 1971.

(SEAL)
Attest:

EDWARD M. FLETCHER, JR.
Attesting Officer

WILLIAM E. SCHUYLER, JR.
Commissioner of Patents